(12) United States Patent
Soenen et al.

(10) Patent No.: US 10,286,836 B2
(45) Date of Patent: May 14, 2019

(54) AUTOMOTIVE LIGHTING DEVICE WITH SIGNALING FUNCTION

(71) Applicant: Valeo Vision, Bobigny (FR)

(72) Inventors: Xavier Soenen, Angers (FR); Christophe Baert, Montreuil Juigne (FR)

(73) Assignee: VALEO VISION, Bobigny (FR)

(*) Notice: Subject to any disclaimer, the term of this patent is extended or adjusted under 35 U.S.C. 154(b) by 516 days.

(21) Appl. No.: 14/868,962

(22) Filed: Sep. 29, 2015

(65) Prior Publication Data
US 2016/0097506 A1    Apr. 7, 2016

(30) Foreign Application Priority Data

Oct. 1, 2014 (FR) ..................................... 14 59388

(51) Int. Cl.
| | |
|---|---|
| *B60Q 1/32* | (2006.01) |
| *G02B 5/136* | (2006.01) |
| *G02B 17/08* | (2006.01) |
| *B60Q 1/00* | (2006.01) |
| *F21S 43/27* | (2018.01) |
| *F21S 43/20* | (2018.01) |
| *F21S 43/30* | (2018.01) |
| *F21S 43/37* | (2018.01) |
| *F21S 43/31* | (2018.01) |

(Continued)

(52) U.S. Cl.
CPC ............. *B60Q 1/32* (2013.01); *B60Q 1/0041* (2013.01); *F21S 43/26* (2018.01); *F21S 43/27* (2018.01); *F21S 43/30* (2018.01); *F21S 43/31* (2018.01); *F21S 43/37* (2018.01); *F21S 43/40* (2018.01); *F21S 43/50* (2018.01); *F21S 43/51* (2018.01); *G02B 5/136* (2013.01); *G02B 17/086* (2013.01)

(58) Field of Classification Search
CPC ... B60Q 1/00; B60Q 1/02; B60Q 1/26; B60Q 1/28; B60Q 1/32; B60Q 1/0041; B60Q 1/0047; B60Q 1/04; B60Q 1/16; B60Q 1/0017; B60Q 1/18; B60Q 1/24; B60Q 1/2696; B60Q 1/34; B60Q 1/38; B60Q 1/46; F21S 48/115; F21S 48/1154; F21S 48/1159; F21S 48/1233; F21S 48/20; F21S 48/215; F21S 48/24; F21S 43/00; F21S 43/14; F21S 43/245; F21S 43/26
See application file for complete search history.

(56) References Cited

U.S. PATENT DOCUMENTS 3,766,373 A * 10/1973 Hedgewick ............. F21S 43/51
362/235
4,831,503 A * 5/1989 DeSantis ............... B60Q 1/2607
362/240

(Continued)

FOREIGN PATENT DOCUMENTS

| CN | 203586025 U | 5/2014 |
|---|---|---|
| EP | 0570278 A1 | 11/1993 |

(Continued)

*Primary Examiner* — Hargobind S Sawhney
(74) *Attorney, Agent, or Firm* — Oblon, McClelland, Maier & Neustadt, L.L.P.

(57) ABSTRACT

A lighting and/or signaling device for a motor vehicle able to perform a side signaling function, the device comprising a bezel provided with an opening and a reflex-reflective element arranged at this opening, the reflex-reflective element being mounted to the rear of the bezel.

18 Claims, 6 Drawing Sheets

(51) Int. Cl.
*F21S 43/40* (2018.01)
*F21S 43/50* (2018.01)

(56) References Cited

U.S. PATENT DOCUMENTS

| | | | | |
|---|---|---|---|---|
| 5,081,564 A * | 1/1992 | Mizoguchi | ............... | F21S 43/26 |
| | | | | 362/521 |
| 5,546,284 A * | 8/1996 | Harada | ................ | B60Q 1/0041 |
| | | | | 362/487 |
| 5,552,969 A * | 9/1996 | Murakami | ........... | B60Q 1/2607 |
| | | | | 362/520 |
| 5,692,824 A * | 12/1997 | Ooishi | ................. | B60Q 1/2607 |
| | | | | 362/240 |
| 6,095,672 A * | 8/2000 | Beninga | ............. | B60Q 1/2607 |
| | | | | 362/545 |
| 6,612,728 B2 | 9/2003 | Roller et al. | | |
| 6,811,287 B2 | 11/2004 | Roller et al. | | |
| 7,040,791 B2 * | 5/2006 | Nakamura | ........... | B60Q 1/0041 |
| | | | | 362/365 |
| 7,399,106 B2 * | 7/2008 | Reading | ................. | F21S 43/26 |
| | | | | 362/521 |
| 8,840,289 B2 | 9/2014 | Lindsay et al. | | |
| 2002/0003708 A1 | 1/2002 | Roller et al. | | |
| 2002/0034080 A1 * | 3/2002 | Tamai | ..................... | B60Q 1/26 |
| | | | | 362/521 |
| 2003/0165065 A1 | 9/2003 | Roller et al. | | |
| 2010/0290243 A1 * | 11/2010 | Janssen | ................ | B60Q 1/0041 |
| | | | | 362/551 |
| 2011/0255298 A1 | 10/2011 | Lindsay et al. | | |
| 2012/0224385 A1 * | 9/2012 | Godbillon | ............. | F21S 48/215 |
| | | | | 362/511 |

FOREIGN PATENT DOCUMENTS

| | | | | | |
|---|---|---|---|---|---|
| EP | 1247690 A2 * | 10/2002 | ......... | B60Q 1/2696 |
| FR | 1443756 | 6/1966 | | |
| FR | 2021553 | 7/1970 | | |
| FR | 2661377 A1 * | 10/1991 | ........... | B60Q 1/2607 |
| FR | 2713167 A1 | 6/1995 | | |
| GB | 1016301 A * | 1/1966 | .............. | F21S 48/20 |
| GB | 2207230 A * | 1/1989 | ........... | B60Q 1/0058 |
| JP | 2001216813 A | 8/2001 | | |
| JP | 2012108213 A | 6/2012 | | |
| JP | 2014143120 A | 8/2014 | | |
| RO | 129391 | 4/2014 | | |

* cited by examiner

AUTOMOTIVE LIGHTING DEVICE WITH SIGNALING FUNCTION

CROSS-REFERENCE TO RELATED APPLICATIONS

This application claims priority to the French application 1459388 filed on Oct. 1, 2014, which application is incorporated herein by reference and made a part hereof.

BACKGROUND OF THE INVENTION

1. Field of the Invention

The present invention relates to a lighting and/or signaling device for a vehicle, notably a motor vehicle, having a side signaling function.

2. Description of the Related Art

The invention notably finds applications in the field of motor vehicles such as, for example, motorized two-wheeled vehicles, private automobiles, light utility vehicles or heavy goods vehicles.

The regulations in certain countries dictate that motor vehicles be fitted with lighting and/or signaling devices that have a side signaling function so as to indicate their presence to other road users situated to the sides of the vehicle when these vehicles are notably being illuminated from the side by these other users.

To achieve this, these devices are provided with a reflex-reflective element comprising an optical system of the catadioptric type implementing reflective faces arranged in such a way that a ray of light reaching this element is reflected thereby in a direction substantially parallel to its direction of incidence.

Figure 1:
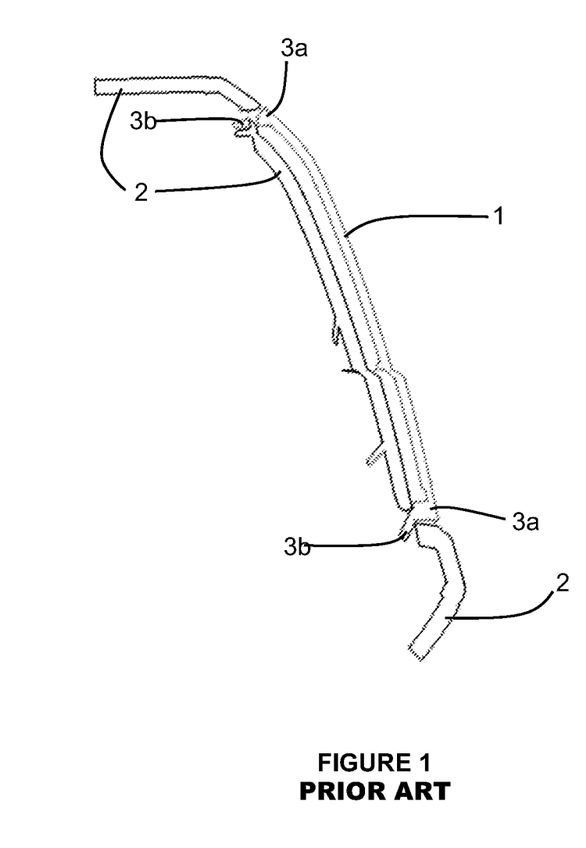
FIG. 1 is a schematic view in cross section of a bezel of a lighting and/or signaling device of the prior art, comprising a reflex-reflective element mounted at the front.

As illustrated by FIG. 1, which is a view in cross section of a device according to the known prior art, the reflex-reflective element 1 is then positioned on a bezel 2 generally arranged in a housing constituting the lighting and/or signaling device. More specifically, this reflex-reflective element 1 is mounted at the front, namely on the external face in the normal direction of mounting, of the bezel 2 by push-fitting with elastic deformation (clipping together) using fixing elements 3b of the reflex-reflective element 1, notably tabs or clips, which collaborate with complementary fixing elements comprised in the bezel 2, such as orifices.

One of the major disadvantages with such devices is connected with the fact that they do not allow an optimal side signaling function to be performed. This is because the reflective zone thus offered by the reflex-reflective element in this device comprises parts that are optically ineffective. These optically ineffective parts are due to the fact that there are interposed elements 3a such as ribs in the reflex-reflective element which ribs are needed for mounting the reflex-reflective element at the front of the bezel.

Furthermore, the fixing tabs or clips made from the interposed elements and these interposed elements themselves are visible from the outside of the device, detracting from the appearance of the device.

In order to alleviate this disadvantage it is known practice to employ a solution that envisions mounting, in these devices, reflex-reflective elements which have larger optically effective visible surfaces.

However, such a solution is often difficult to implement in increasingly complex lighting and/or signaling devices in which optimizing the use of the available space is a recurring issue. As a result, the mounting in such devices of these reflex-reflective elements provided with such surfaces may occupy an amount of space that is not insignificant and is detrimental to the operation of these devices. In addition, it does nothing to improve the appearance.

SUMMARY OF THE INVENTION

It is an object of the present invention to overcome all or some of the abovementioned disadvantages.

Advantageously, the invention makes it possible to optimize the optical performance of the lighting and/or signaling device that has a side signaling function, while at the same time improving the appearance thereof.

In this respect, one subject of the invention is a lighting and/or signaling device for a motor vehicle able to perform a side signaling function with at least one reflex-reflective element, the device comprising a bezel comprising a front face facing toward the outside of the device in the normal direction of mounting, which front face is at least partially visible to an observer outside the device, and provided with an opening and a reflex-reflective element arranged at this opening.

This device is notable in that the reflex-reflective element is mounted to the rear of the bezel, the rear face of the bezel facing in the normal direction of mounting toward the inside of the device and not being visible to an external observer.

According to various embodiments of the invention, which may be considered together or separately:
- the reflex-reflective element is arranged in a housing space created in a rear face of the bezel, the housing space comprising a bottom formed of the opening and a bearing region defining the periphery of the opening;
- the reflex-reflective element comprises, on all or part of its periphery, interposed elements, notably ribs, which can be pressed against the bearing region of a housing space;
- the reflex-reflective element comprises a translucent window;
- the device comprises a light source arranged on a printed circuit;
- the device comprises an occulting element positioned between a printed circuit and the reflex-reflective element;
- the occulting element comprises an orifice through which a ray of light emitted by the light source toward the translucent window can pass;
- the reflex-reflective element comprises connecting elements;
- the connecting elements are able to keep the reflex-reflective element fixed to the bezel and/or to the occulting element;
- the reflex-reflective element and a printed circuit can be mounted on an occulting element which occulting element is able to be fixed to the bezel;
- the device is arranged at the front and/or at the rear and/or on a side part of a motor vehicle;
- the reflex-reflective element comprises a catadioptric optical system; and the device comprises a protective outer lens and a housing, the protective outer lens being mounted on the housing in such a way as to define an internal volume in which the reflex-reflective element is contained.

The invention also relates to a method of assembling a lighting and/or signaling device for a motor vehicle able to perform a side signaling function comprising a bezel provided with an opening and notable in that it comprises a step of arranging the reflex-reflective element to the rear of the bezel at the opening.

Furthermore, the arranging step plans for the reflex-reflective element to be inserted into a housing space situated at the rear face of the bezel.

Other advantages and features of the invention will become better apparent from reading the following description of one preferred embodiment, given by way of indicative and nonlimiting example with reference to the figures:

DETAILED DESCRIPTION OF THE PREFERRED EMBODIMENTS

In all that follows, the orientations of the lighting and/or signaling device that are used are the usual orientations of a motor vehicle. In particular, the terms "front", "rear", "left", "right", "side", "upper" and "lower" are to be understood in relation to the direction of travel of the motor vehicle.

Furthermore, the terms "front face" and "rear face" of a component are themselves to be understood according to the normal direction of mounting, respectively as being the face exposed to the outside of the device and as being the face facing toward the inside of the device and not visible to an external observer once the device has been assembled.

In the embodiment of the invention, the lighting and/or signaling device performs a side signaling function on the motor vehicle but is also able to carry out the usual lighting or signaling functions such as the conventional functions of high beam lighting or low beam lighting when the device is arranged at the front of the vehicle or position lighting or stop lighting or even reversing lighting when the device is situated at the rear of the vehicle.

Figure 3A:
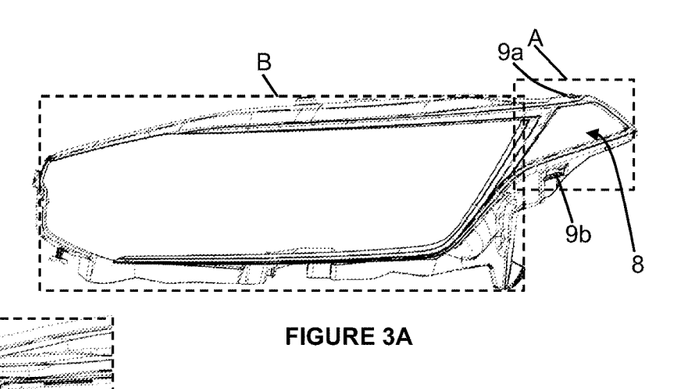
FIG. 3A is a view of the front face of a bezel of the lighting and/or signaling device according to the embodiment of the invention.
Figure 3B:
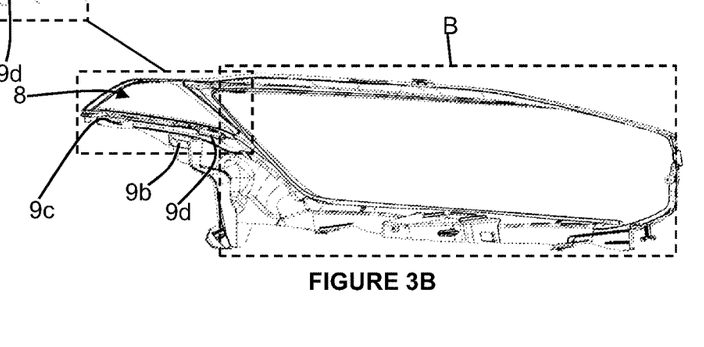
FIG. 3B is a view of the rear face of a bezel of the lighting and/or signaling device according to the embodiment of the invention.

The internal components of the device that allow these lighting functions to be performed are in theory arranged at part B of the bezel 4 of this device, which is visible in FIGS. 3A and 3B. The internal components of the device that allow the side signaling function to be performed are themselves arranged at part A of the bezel 4 of this device.

Alternatively, this device may be designed to perform only this side signaling function, in which case it is generally situated on the sides of the vehicle.

It will be noted that the side signaling function of the lighting and/or signaling device makes it possible to signal the presence of the vehicle when the vehicle is being observed or illuminated from the side, notably at night. Thus, this device may be considered as being a vehicle lateral position indicator.

This device comprises a housing (not depicted) containing a certain number of internal components able to perform the lighting functions and also able to perform the side signaling function.

Figure 2:
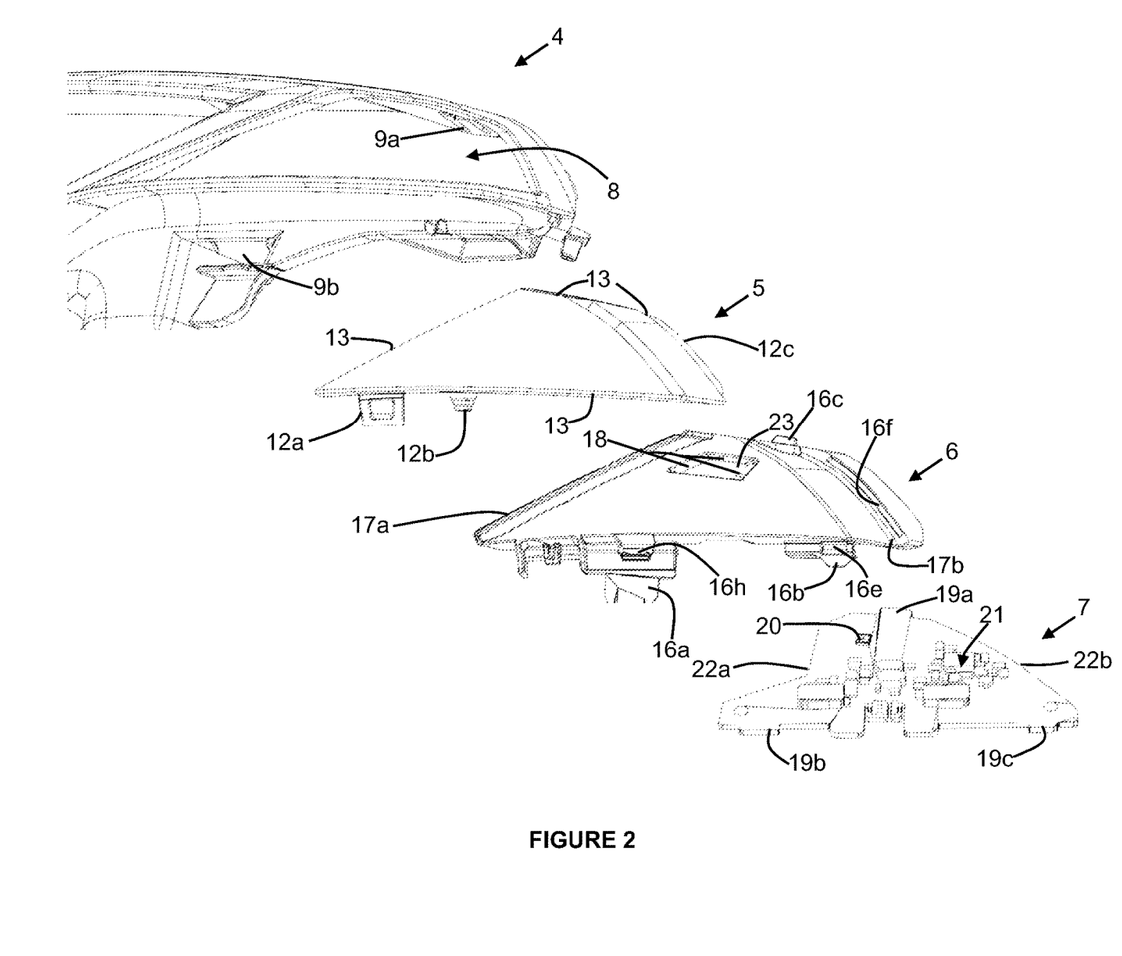
FIG. 2 is a view of the bezel and of the internal components that make up this lighting and/or signaling device according to the embodiment of the invention.

In the embodiment which is described, in order to perform this side signaling function, the internal components of the device which are visible in FIG. 2 comprise nonlimitingly and non-exhaustively:

- a reflex-reflective element 5, also known by the name of "side reflex";
- a printed circuit 7 comprising a light source 20, also known as a "side marker" and
- an occulting element 6, also known as a shield.

In alternative forms of this embodiment which are described hereinafter the device may perform this side signaling function by comprising only the reflex-reflective element 5 or alternatively the reflex-reflective element 5 associated with the printed circuit 7 provided with the light source 20.

The device also comprises an outer lens (not depicted) mounted on the housing, that it closes in the manner of a cover so as to protect the internal components while at the same time transmitting the light emitted by the light source 20 and/or reflected by the reflex-reflective element 5.

The outer lens, together with the housing, delimits an internal volume in which the internal components are housed. Also placed inside the internal volume is the bezel 4 behind and on which these internal components are arranged. As its name suggests, the bezel 4 has the function of concealing from the sight of an external observer the arrangement of the various internal components of the signaling device, notably the connections, adjusting means and means of attachment to the housing.

The bezel 4 visible notably in FIGS. 3A and 3B in this embodiment is comprised in a lighting and/or signaling device which is arranged at the front left of the vehicle. FIG.

3A illustrates a view of a front face of the bezel 4 and FIG. 3B illustrates a view of a rear face of this bezel 4.

Figure 3C:
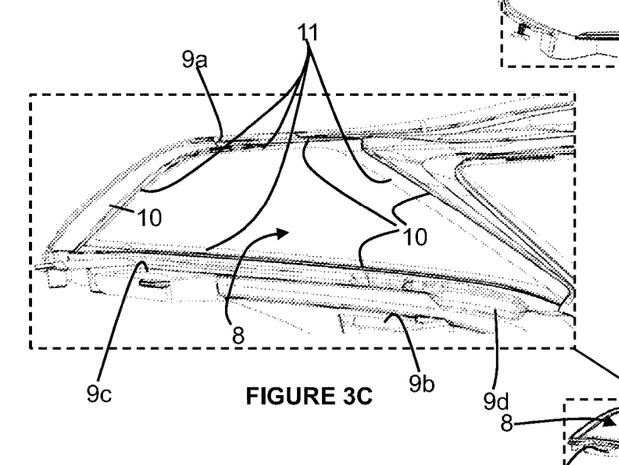
FIG. 3C is a view on a larger scale of a housing space contained in the rear face of the bezel capable of accepting a reflex-reflective element according to the embodiment of the invention.

In FIG. 3C, which is a view of the rear face of the part A of the bezel 4 on a larger scale, this rear face comprises a housing space formed of a wall 10 delimiting the bottom of this housing space of the rear face of the bezel 4. This bottom is formed of an opening 8 and of a bearing region 11 defining the periphery of the opening 8. This housing space is created in part A of the bezel 4 which extends substantially along the lateral side of the vehicle so that the device can perform the side signaling function. More specifically in this embodiment, this housing space is situated at a left-hand end of the bezel 4.

The bezel 4, and also the device, may in this part A be curved so that it substantially follows the shape of the associated corner of the vehicle.

This housing space provided with this opening 8 is configured to accept the reflex-reflective element 5, or the reflex-reflective element 5 with the printed circuit 7 provided with the light source 20, or even the reflex-reflective element 5, the occulting element 6 and the printed circuit 7 provided with the light source 20.

The housing space has a shape substantially similar to that of the reflex-reflective element 5. The opening 8 formed in the bottom of this housing space has a surface area which is substantially smaller than that of a front face of the reflex-reflective element 5.

The rear face of the part A of the bezel 4 visible in FIGS. 2 and 3C comprises first, second, third and fourth fixing elements 9*a*, 9*b*, 9*c*, 9*d* arranged near the housing space or even on the wall 10 thereof to provide what may be a reversible mechanical connection with the internal components: reflex-reflective element 5, occulting element 6, printed circuit 7.

Figure 4A:
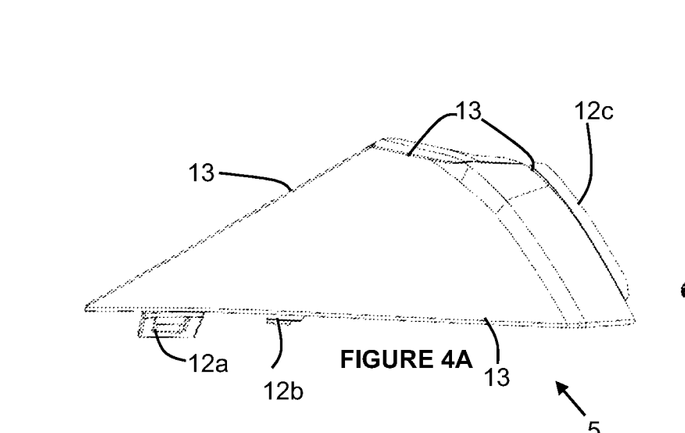
FIG. 4A is a view of the front face of the reflex-reflective element according to the embodiment of the invention.
Figure 4B:
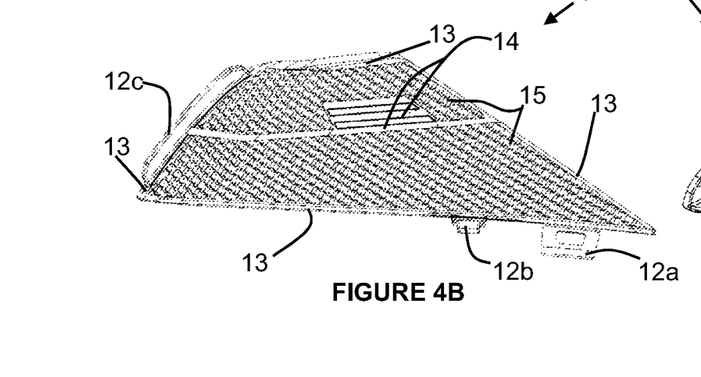
FIG. 4B is a view of the rear face of the reflex-reflective element according to the embodiment of the invention.

The reflex-reflective element 5 comprises front and rear faces, visible in FIGS. 2, 4A and 4B, and a catadioptric optical system 15 (FIGS. 4B and 11) formed notably of catadioptric patterns on all or part of the rear face of the reflex-reflective element 5. This optical system 15 is able to reflect a beam of visible or near-infrared light in the direction of the incident light flux, whatever the angle of incidence.

In this embodiment, the rear face of the reflex-reflective element 5 may nonlimitingly comprise at least one zone devoid of such a catadioptric optical system 15, forming a translucent window 14 through which a ray of light emitted by the light source 20 mounted on the printed circuit 7 may travel.

The reflex-reflective element 5 is reinforced around all or part of its periphery by interposed elements 13, notably ribs, visible in FIGS. 4A and 4B. These interposed elements 13 are notably there to collaborate with suitable tools so that the reflex-reflective element 5 can be optimally manipulated thus avoiding damaging it notably during operations of mounting it in the housing space. They also make it possible to prevent the prisms of the catadiopter from rubbing on the rear part, which generates dust and leads to a loss in optical performance.

The interposed elements 13 comprise first, second and third fixing elements 12*a*, 12*b*, 12*c* for fixing the reflex-reflective element 5, making it possible to achieve what may be a reversible mechanical connection of the latter to the bezel 4 and/or the occulting element 6 and/or the printed circuit 7.

The first and second fixing elements 12*a*, 12*b* are arranged at the lower edge of the reflex-reflective element 5 and the third fixing element 12*c* is arranged at the left side edge.

It will be noted that the reflex-reflective element 5 may have a curved shape when viewed in profile. It may furthermore be colored in accordance with regulatory requirements: in general, side signaling functions have to be amber in color.

Figure 5A:
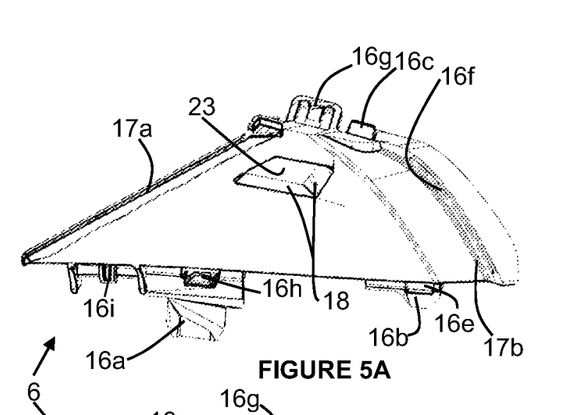
FIG. 5A is a view of the front face of an occulting element according to the embodiment of the invention.
Figure 5B:
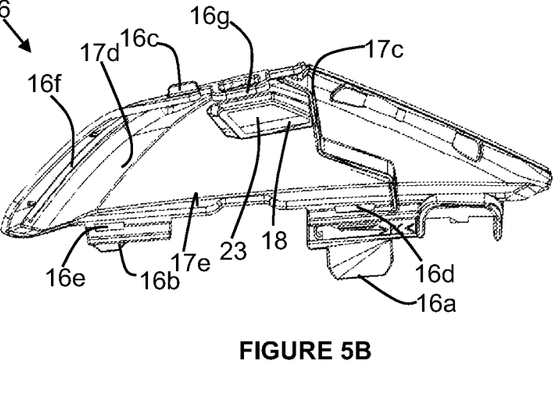
FIG. 5B is a view of the rear face of the occulting element according to the embodiment of the invention.

In FIGS. 2, 5A and 5B, the occulting element 6 comprises front and rear faces and an orifice 23 through which a ray of light from the light source 20 situated on the printed circuit 7 can pass. This orifice 23, which may have a substantially polygonal or circular shape, comprises a wall 18 projecting from the rear face of the occulting element 6.

This occulting element 6 comprises first and second positioning elements 17*a*, 17*b* present on its front face and visible in FIG. 5A, and third, fourth and fifth positioning elements 17*c*, 17*d*, 17*e* situated on the rear face of this occulting element 6 and visible in FIG. 5B.

The first and second positioning elements 17*a*, 17*b* are configured to collaborate with the lateral edges of the reflex-reflective element 5. These first and second positioning elements 17*a*, 17*b* incidentally have a shape that substantially complements that of the lateral edges with which they collaborate.

In addition to being provided with first and second positioning elements 17*a*, 17*b*, the front face has, when viewed in profile, a shape that is substantially similar to and complements that of the rear face of the reflex-reflective element 5 so as to allow this reflex-reflective element 5 to be positioned correctly and optimally on the front face of the occulting element 6.

Likewise, the third and fourth positioning elements 17*c*, 17*d* are configured to collaborate with the lateral edges 22*a*, 22*b* of the printed circuit 7 and the fifth positioning element 17*e* with the lower edge of this printed circuit 7. These third, fourth and fifth positioning elements 17*c*, 17*d*, 17*e* also have a shape that substantially complements that of the edges with which they collaborate. Such positioning elements 17*c*, 17*d*, 17*e* notably allow the light source 20 to be optimally aligned with the orifice 23 made in the occulting element 6.

It will further be noted that the first and third positioning elements 17*a*, 17*c* have an additional occulting function intended to prevent light from leaking from the light source 20.

The occulting element 6 also comprises first, second, third, fourth, fifth, sixth, seventh, eighth and ninth fixing elements 16*a*, 16*b*, 16*c*, 16*d*, 16*e*, 16*f*, 16*g*, 16*h*, 16*i* allowing what may be a reversible mechanical connection with the reflex-reflective element 5 on the front face thereof, the printed circuit 7 on the rear face thereof and with the bezel 4. The first, second, fourth, fifth, eighth and ninth fixing elements 16*a*, 16*b*, 16*d*, 16*e*, 16*h*, 16*i* are arranged at the lower edge of the occulting element 6. The third and seventh fixing elements 16*c*, 16*g* are situated at the upper edge of the occulting element 6 and the sixth fixing element 16*f* at the left lateral edge of this occulting element 6.

Figures 6, 8:
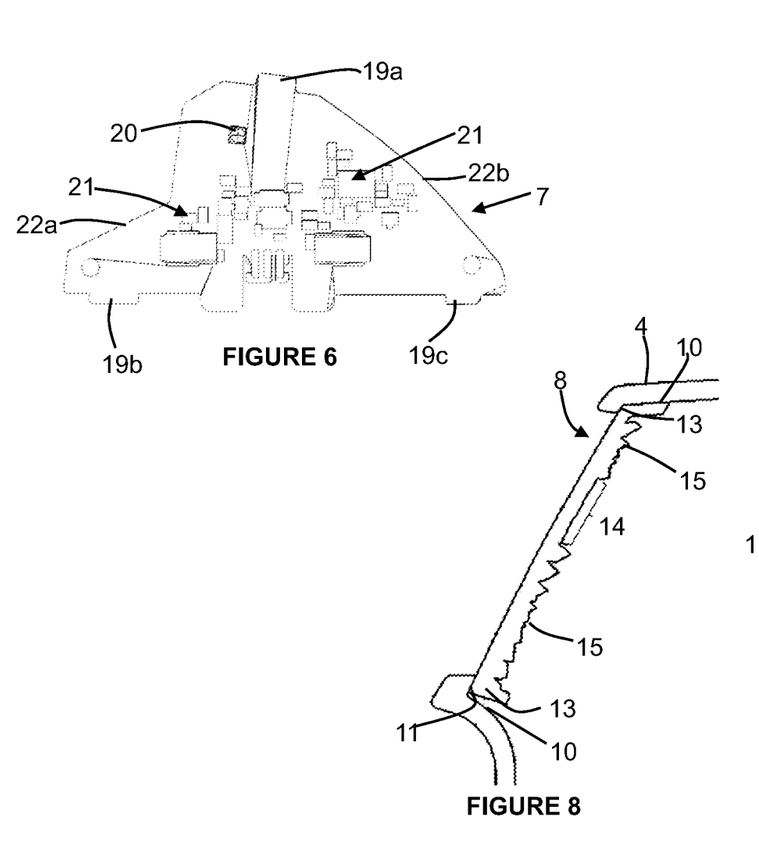
FIG. 6 is a view of the front face of a printed circuit comprising a light source according to the embodiment of the invention.
FIG. 8 is a schematic view in cross section of the housing space in which the reflex-reflective element is arranged according to the embodiment of the invention.

The printed circuit 7 comprises front and rear faces. Arranged on the front face visible in FIGS. 2 and 6 is a light source 20 and electronic components 21 notably allowing control of the light source 20. The printed circuit 7 may comprise more than one light source 20. This light source 20 may for example be an optoelectronic component such as a light-emitting diode more commonly known by its abbreviation LED.

The printed circuit 7 also comprises first, second and third fixing elements 19*a*, 19*b*, 19*c*. The first fixing element 19*a* is situated on the upper edge of this printed circuit 7 and the second and third fixing elements 19*b*, 19*c* opposite on the lower edge. These first, second and third fixing elements 19a, 19b, 19c may make it possible to create a reversible mechanical connection with the occulting element 6 and/or the bezel 4.

Figure 7:
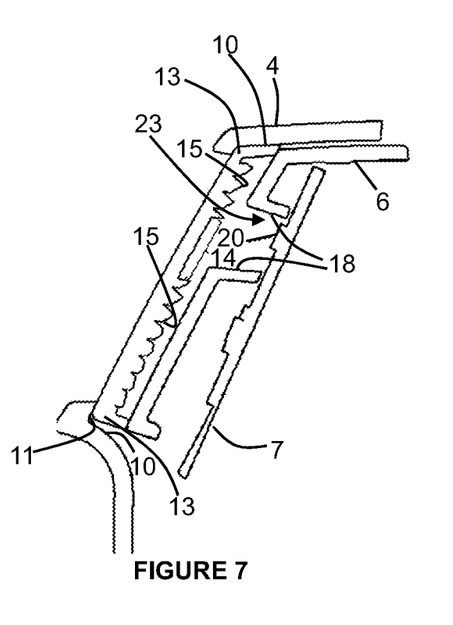
FIG. 7 is a schematic view in cross section of the housing space in which is arranged the reflex-reflective element and the occulting element and the printed circuit according to the embodiment of the invention.

In FIG. 7, which is a schematic view in cross section of the bezel 4 of the device, the latter comprises the reflex-reflective element 5, the occulting element 6 and the printed circuit 7 mounted on the bezel 4. In this configuration, the reflex-reflective element 5 comprising the catadioptric optical system 15, the light guide and the interposed elements 13 is arranged at the opening 8 in the bezel 4 by being mounted to the rear of the latter.

More specifically, the reflex-reflective element 5 is arranged in the housing space in such a way that the interposed elements 13 comprised in all or part of the periphery of this reflex-reflective element 5 are pressed firmly against the bearing region 11 which with the opening 8 constitutes the bottom of the housing space. Thus, the visible part of the reflex-reflective element 5 at the front face of the bezel 4, referred to as the visible part, is the optically effective part of the reflex-reflective element 5 (visible in FIG. 10). The optically ineffective part comprising the interposed elements 13 is not visible from the front face of the bezel 4 because it is shielded by the bearing region 11 of the housing space. Furthermore, it will be clearly appreciated, unlike in the prior art explained in FIG. 1, that all the fixing tabs of the reflex-reflective element 5 are no longer visible when the lighting and/or signaling device is observed from the outside.

Figures 9, 10, 11:
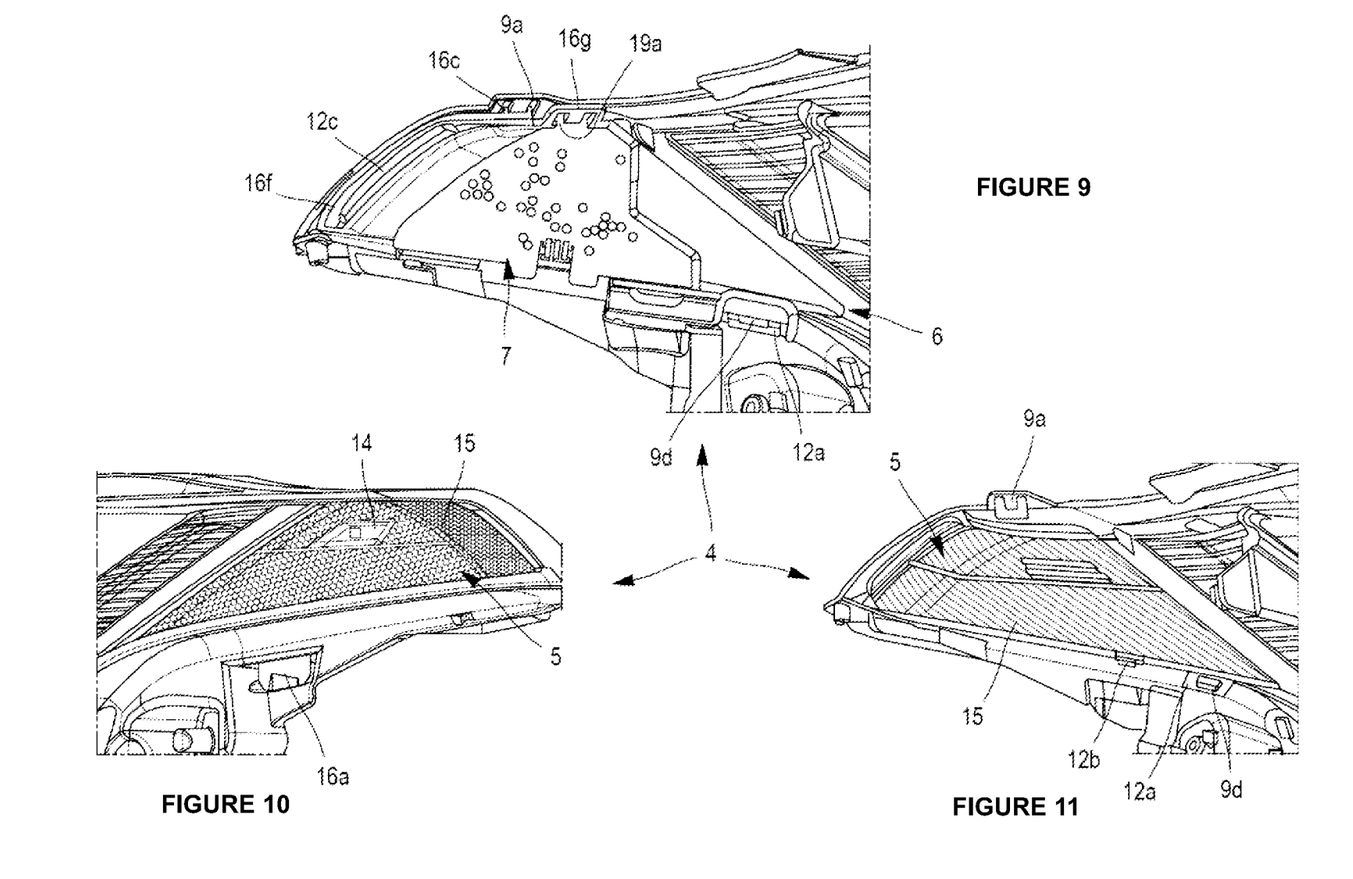
FIG. 9 is a view of the housing space contained in the rear face of the bezel in which space is mounted the reflex-reflective element and the occulting element and the printed circuit according to the embodiment of the invention.
FIG. 10 is a view of the front face of the bezel when the reflex-reflective element is mounted in the housing space and the occulting element and the printed circuit according to the embodiment of the invention.
FIG. 11 is a view of the housing space contained in the rear face of the bezel in which the reflex-reflective element is mounted according to the embodiment of the invention.

The reflex-reflective element 5 is kept mechanically connected to the bezel 4 by the mechanical connection achieved through the collaboration of the first fixing element 12a with the complementary fourth fixing element 9d of the bezel 4, for example by clip fastening, and also by the wall 10 of the housing space which is in contact with the edges of the reflex-reflective element 5 (which can be seen in FIGS. 9 and 11).

In this configuration, the occulting element 6 is arranged between the reflex-reflective element 5 and the printed circuit 7 comprising the light source 20.

More specifically, the reflex-reflective element 5 is positioned on the front face of the occulting element 6 notably from the first and second positioning elements 17a, 17b which collaborate with the lateral edges thereof. This reflex-reflective element 5 is mechanically connected to the occulting element 6 by its first, second and third fixing elements 12a, 12b, 12c which collaborate respectively with the complementary ninth, eighth and sixth fixing elements 16i, 16h, 16f of this occulting element 6. Because the reflex-reflective element 5 is thus positioned and connected to the occulting element 6, the light guide 14 with which it is provided is therefore arranged facing the orifice 23 formed in the occulting element 6. It will be noted that the rear face of the reflex-reflective element 5 in this configuration is close to the front face of the occulting element 6, leaving a clearance so as to prevent the prisms of the reflex-reflective element 5 from rubbing against the occulting element 6.

Arranged on the rear face of the occulting element 6 visible in FIG. 9 is the printed circuit 7. The printed circuit 7 is positioned on this rear face using the third, fourth and fifth positioning elements 17c, 17d, 17e of the occulting element 6 which collaborate respectively with the lateral edges 22a, 22b and lower edges of the printed circuit 7. The printed circuit 7 is mechanically connected to the occulting element 6 using its first, second and third fixing elements 19a, 19b, 19c which respectively collaborate with the complementary seventh, fourth and fifth fixing elements 16g, 16d, 16e of the occulting element 6.

In this configuration, the light source 20 of the printed circuit 7 is therefore arranged facing the orifice 23 of the occulting element 6. The light guide 14, the orifice 23 and the light source 20 can be aligned axially. In this configuration, the border of the wall 18 of the orifice 23 projecting on the rear face of the occulting element 6 is situated close to, or even in contact with, a zone situated on the front face of the printed circuit 7 at the periphery of the light source 20. Thus, the wall 18 of the orifice 23 of the occulting element 6 thus arranged allows rays of light emitted by the light source 20 to be channeled optimally by surrounding them and prevents light from leaking elsewhere in the device.

The occulting element 6 is also mechanically connected to the bezel 4 using its first, second and third fixing elements 16a, 16b, 16c which collaborate respectively with the complementary second, third and first fixing elements 9b, 9c, 9a of the bezel 4.

In this configuration, the use of the occulting element 6 contributes to ensuring that the interposed elements 13 are pressed optimally against the bearing region 11 and also that the other internal components are pressed against the bezel 4, thereby reducing any clearances there may be between these components and thus avoiding the ingress of dust between them, notably between the occulting element 6 and the reflex-reflective element 5.

In this embodiment, there are various alternative ways of embodying the lighting and/or signaling device with side signaling function.

In a first alternative form illustrated in FIGS. 8 and 11, the device comprises only the reflex-reflective element 5 arranged at the opening 8 in the bezel 4 by being mounted to the rear thereof. In particular, this reflex-reflective element 5 is positioned in the housing space in such a way that the interposed elements 13 found on all or part of the periphery of this reflex-reflective element 5 are pressed firmly against the bearing region 11 which, with the opening 8 constitutes the bottom of the housing space. This firm pressing of the interposed elements 13 against the bearing region 11 is achieved by virtue of the mechanical connection achieved between the reflex-reflective element 5 and the bezel 4 by the first fixing element 12a visible in FIG. 11 which collaborates with the fourth fixing element 9d of the bezel 4. This connection may be improved by the addition of other fixing elements situated on the interposed elements 13 and able to collaborate with complementary fixing elements belonging to the bezel 4. It will be noted that the wall 10 of the housing space by collaborating with the edges of the reflex-reflective element 5 may also contribute to achieving this mechanical connection, for example by friction.

In this alternative form, the reflex-reflective element 5 preferably comprises the catadioptric optical system 15 and has no light guide 14.

In a second alternative form (not depicted), the reflex-reflective element 5 comprises the light guide 14 in which a ray of light can travel. The printed circuit 7 provided with the light source 20 may be mounted at the housing space so that the light source 20 is arranged facing the light guide 14. In this alternative form, the first, second and third fixing elements 19a, 19b, 19c of the printed circuit 7 are able to collaborate respectively with complementary fixing elements of the bezel 4 which are situated on the rear face of the bezel 4, for example near the wall 10 of the housing space.

Alternatively, these complementary fixing elements may also be situated on the interposed elements 13 of the reflex-reflective element 5 or may alternatively be distributed both on these interposed elements 13 and on the rear face of the bezel 4.

One aspect of the invention relates to a method of assembling the lighting and/or signaling device able to perform the side signaling function.

This method involves a step of arranging the reflex-reflective element 5 to the rear of the bezel 4 at the opening 8 in the part A of this bezel 4 visible in FIGS. 2 and 3A.

This arranging step anticipates insertion of the reflex-reflective element 5 into the housing space and fixing thereof to the bezel 4 by creating a mechanical connection achieved using the first fixing element 12a of this reflex-reflective element 5 collaborating with the complementary fourth fixing element 9d of the bezel 4.

The method also involves a step of mounting the occulting element 6 on the bezel 4. This mounting step anticipates the positioning and fixing of the reflex-reflective element 5 at the front face of the occulting element 6, and the fixing of the occulting element 6 to the rear face of the bezel 4 near the housing space. This mounting step notably allows the interposed elements 13 of the reflex-reflective element 5 to be pressed yet more firmly against the bearing region 11 of the housing space and ensures substantially axial alignment between the light guide 14 and the orifice 23 of the occulting element 6.

The method involves a step of installing the printed circuit 7 on the rear face of the occulting element 6 in which step the printed circuit 7 is positioned in a particular way on this face using the third, fourth and fifth positioning elements 17c, 17d, 17e which collaborate with the edges of the printed circuit 7. During this step, a mechanical connection is made between the printed circuit 7 and the occulting element 6 between the first, second and third fixing elements 19a, 19b, 19c of the printed circuit 7 and the complementary seventh, fifth and fourth fixing elements 16g, 16e, 16d, of the occulting element 6.

Alternatively, the method may comprise a preliminary step during which the reflex-reflective element 5, the occulting element 6 and the printed circuit 7 are preassembled to form an assembly which is subsequently inserted into the housing space and fixed on the rear face of the bezel 4.

The mechanical connection between the various internal components or between these and the bezel 4 may be achieved nonexhaustively and nonlimitingly by push fitting with elastic deformation (clip fastening), screwing, bonding or even by a combination of these various types of connection.

For example, insofar as the reflex-reflective element 5 is mechanically connected to the bezel 4 by bonding, an adhesive may be applied to the front face of the reflex-reflective element 5 on which the interposed elements 13 are located or to the bearing region 11 with which they are in contact.

In another example in which the reflex-reflective element 5 may be mechanically connected to the bezel 4 by screwing, at least one orifice may be formed at the interposed elements 13 and a threaded bore at the corresponding bearing region 11 so that a screw can keep the reflex-reflective element 5 fixed to the bezel 4.

It will be noted that the mechanical connection achieved by bonding and/or screwing and/or clip fastening allows the reflex-reflective element 5 to be kept fixed to the bezel 4 despite the vibrations to which the device may be subjected when the vehicle is in operation.

The present invention is not restricted to the embodiment that has been explicitly described but it includes various alternative forms and generalizations thereof that fall within the scope of the claims that follow.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for a motor vehicle able to perform a side signaling function with at least one reflex-reflective element, said lighting device comprising:
   a bezel comprising a front face facing toward the outside of said lighting device in the normal direction of mounting within the motor vehicle, said front face is at least partially visible to an observer outside said lighting device, and provided with an opening and said at least one reflex-reflective element arranged at said opening, wherein said at least one reflex-reflective element is mounted to the rear of said bezel, the rear face of said bezel facing in the normal direction of mounting toward the inside of said lighting device and not being visible to an external observer, wherein
   said at least one reflex-reflective element comprises a translucent window, and
   said lighting device comprises an occulting element positioned between a printed circuit and said at least one reflex-reflective element.

2. The lighting device according to claim 1, wherein said at least one reflex-reflective element is arranged in a housing space created in said rear face of said bezel, said housing space comprising a bottom formed of said opening and a bearing region defining the periphery of said opening.

3. The lighting device according to claim 2, wherein said at least one reflex-reflective element comprises, on all or part of its periphery, interposed elements, notably ribs, which can be pressed against said bearing region of said housing space.

4. The lighting device according to claim 2, wherein said at least one reflex-reflective element comprises a translucent window.

5. The lighting device according to claim 1, wherein said at least one reflex-reflective element comprises, on all or part of its periphery, interposed elements, notably ribs, which can be pressed against a bearing region of a housing space.

6. The lighting device according to claim 5, wherein said at least one reflex-reflective element comprises a translucent window.

7. The lighting device according to claim 1, wherein said lighting device comprises a light source arranged on a printed circuit.

8. The lighting device according to claim 7, wherein said lighting device comprises an occulting element positioned between said printed circuit and said at least one reflex-reflective element.

9. The lighting device according to claim 7, wherein said at least one reflex-reflective element and said printed circuit can be mounted on an occulting element and said occulting element is able to be fixed to said bezel.

10. The lighting device according to claim 9, wherein said lighting device is arranged at the front, at the rear, or on a side part of the motor vehicle.

11. The lighting device according to claim 1, wherein said occulting element comprises an orifice through which a ray of light emitted by said light source toward said translucent window can pass.

12. The lighting device according to claim 1, wherein said at least one reflex-reflective element comprises connecting elements affixing the reflex-reflective element to the bezel.

13. The lighting device according to claim 1, wherein said at least one reflex-reflective element and a printed circuit can be mounted on an occulting element and said occulting element is able to be fixed to said bezel.

14. The lighting device according to claim 13, wherein said lighting device is arranged at the front, at the rear, or on a side part of the motor vehicle.

15. The lighting device according to claim 1, wherein said lighting device is arranged at the front, at the rear, or on a side part of the motor vehicle.

16. The lighting device according to claim 1, wherein said at least one reflex-reflective element comprises a catadioptric optical system.

17. The lighting device according to claim 1, wherein said lighting device comprises a protective outer lens and a housing, said protective outer lens being mounted on said housing in such a way as to define an internal volume in which said at least one reflex-reflective element is contained.

18. The lighting device according to claim 1, wherein said at least one reflex-reflective element and said printed circuit can be mounted on said occulting element and said occulting element is able to be fixed to said bezel.

* * * * *